United States Patent
Arlitt et al.

(10) Patent No.: US 10,812,509 B2
(45) Date of Patent: Oct. 20, 2020

(54) DETECTING ANOMOLOUS NETWORK ACTIVITY BASED ON SCHEDULED DARK NETWORK ADDRESSES

(71) Applicant: ENTIT Software LLC, Sunnyvale, CA (US)

(72) Inventors: Martin Arlitt, Alberta (CA); Alkiviadis Simitsis, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 231 days.

(21) Appl. No.: 15/796,986

(22) Filed: Oct. 30, 2017

(65) Prior Publication Data
US 2019/0132342 A1    May 2, 2019

(51) Int. Cl.
| | |
|---|---|
| *H04L 29/06* | (2006.01) |
| *G06N 20/00* | (2019.01) |
| *H04L 29/12* | (2006.01) |

(52) U.S. Cl.
CPC ......... *H04L 63/1425* (2013.01); *G06N 20/00* (2019.01); *H04L 61/2015* (2013.01); *H04L 61/2053* (2013.01); *H04L 63/1441* (2013.01)

(58) Field of Classification Search
CPC ............. H04L 63/1425; H04L 61/2015; H04L 61/2053; H04L 63/1441; G06N 20/00
See application file for complete search history.

(56) References Cited

U.S. PATENT DOCUMENTS

| | | | |
|---|---|---|---|
| 2,805,613 A * | 9/1957 | Siems | A01B 35/20 172/643 |
| 7,926,104 B1 * | 4/2011 | Sundaram | H04L 63/108 709/245 |
| 8,056,132 B1 * | 11/2011 | Chang | G06F 21/552 713/187 |
| 8,387,145 B2 | 2/2013 | Xie et al. | |
| 8,413,238 B1 | 4/2013 | Sutton et al. | |
| 8,898,788 B1 * | 11/2014 | Aziz | G06F 21/00 726/24 |
| 8,972,604 B1 * | 3/2015 | Ramsden-Pogue | H04L 61/1511 709/245 |
| 9,356,942 B1 | 5/2016 | Joffe et al. | |
| 9,430,646 B1 * | 8/2016 | Mushtaq | H04L 63/1425 |
| 9,654,504 B1 * | 5/2017 | Vervier | H04L 63/1483 |
| 10,044,675 B1 * | 8/2018 | Ettema | H04L 63/0227 |
| 2004/0103314 A1 | 5/2004 | Liston et al. | |
| 2005/0210534 A1 * | 9/2005 | Krishnamurthy | H04L 63/1408 726/23 |
| 2006/0031476 A1 * | 2/2006 | Mathes | H04L 41/0886 709/224 |

(Continued)

OTHER PUBLICATIONS

Tat-Chee Wan, "A New Dynamic-Auto-Static Technique for DHCPv4 IP Address Allocation," IEEE International Conference on Antennas, Propagation and Systems (INAS 2009), Johor, Malaysia, Dec. 3-5, 2009, 4 pages.

*Primary Examiner* — Ghodrat Jamshidi

(57) ABSTRACT

A technique includes dynamically assigning, by a server, network addresses selected from a plurality of network addresses to network devices of a network based on a schedule. The schedule represents a time during which a given network address is to remain unassigned. The technique includes, based on the schedule, detecting anomalous behavior associated with the network.

20 Claims, 7 Drawing Sheets

(56) References Cited

U.S. PATENT DOCUMENTS

| | | | |
|---|---|---|---|
| 2006/0101515 A1* | 5/2006 | Amoroso | H04L 29/12009 726/23 |
| 2007/0094728 A1* | 4/2007 | Julisch | H04L 63/1425 726/23 |
| 2008/0222275 A1* | 9/2008 | Yumoto | H04L 12/433 709/220 |
| 2010/0074226 A1* | 3/2010 | Gandham | H04W 36/0011 370/331 |
| 2010/0223164 A1* | 9/2010 | Fortier | G06Q 20/02 705/30 |
| 2012/0173684 A1* | 7/2012 | Courtney | H04L 29/12066 709/222 |
| 2013/0232251 A1* | 9/2013 | Pauley | H04L 63/306 709/224 |
| 2014/0173725 A1* | 6/2014 | Beryozkin | H04L 63/1458 726/22 |
| 2014/0317746 A1* | 10/2014 | Hendel | G06F 21/566 726/24 |
| 2015/0264078 A1* | 9/2015 | Beauchesne | H04L 63/1441 726/23 |
| 2016/0006749 A1* | 1/2016 | Cohen | G06F 16/285 726/23 |
| 2017/0302554 A1* | 10/2017 | Chandrasekaran | H04L 43/0882 |
| 2018/0375953 A1* | 12/2018 | Casassa Mont | H04L 12/28 |
| 2019/0098051 A1* | 3/2019 | Carothers | H04L 63/1408 |

\* cited by examiner

DETECTING ANOMOLOUS NETWORK ACTIVITY BASED ON SCHEDULED DARK NETWORK ADDRESSES

BACKGROUND

A network intruder, or adversary (malware, a worm, a virus, and so forth), may secure a foothold in an organization's computer network by infecting a computer of the network. Once the adversary has established the foothold, the adversary may scan addresses to find computers and systems within the organization's network, which hold sensitive data. Moreover, the adversary may work in conjunction with other adversaries that have established similar footholds within the organization's network.

DETAILED DESCRIPTION

Figure 1:
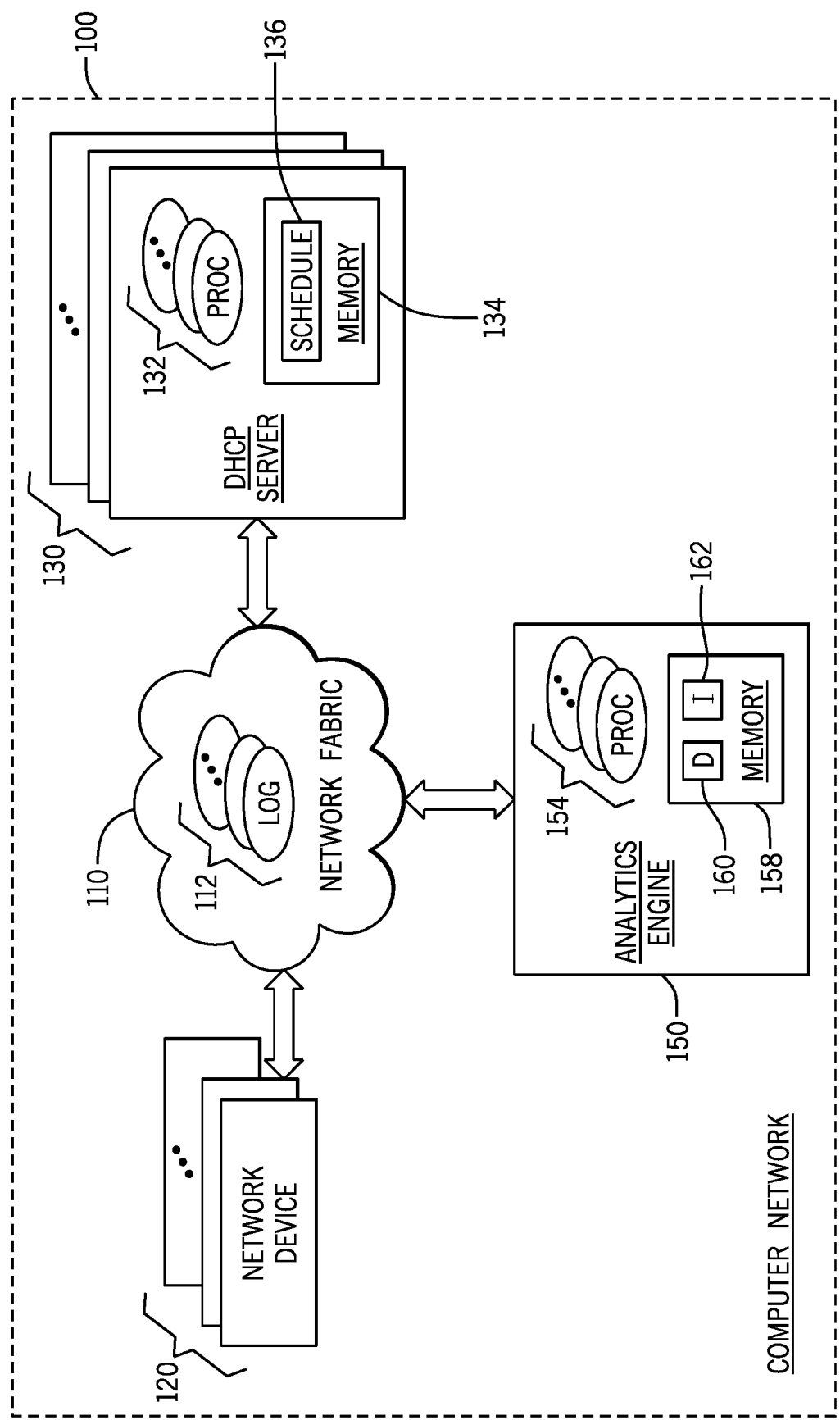
FIG. 1 is a schematic diagram of a computer network according to an example implementation.

A given computer network may have a routable Internet Protocol (IP) address space that is assigned to devices (laptop computers, desktop computers, clients, servers, tablet computers, smartphones, wearable devices, and so forth) of the network. At a given time, some of the IP address space, called the "dark" IP address space (or "dark net" or "dark address space") may be unassigned, or unused.

For example, the network may include a Dynamic Host Configuration Protocol (DHCP) server that, when a client connects to the network, the network device communicates with the DHCP server; and the DHCP server selects an address from an available pool of addresses and assigns the selected address to the network device. The pool of available addresses, in turn, may form part of the dark IP address space of the network. As a more specific example, an organization may allocate a range of IP addresses for laptop computers of the organization, and during certain times (normal business hours, for example), more laptops may be connected to the network and assigned addresses within the range than other times (nights and weekends, for example). Consequently the dark IP address space may vary in size over time.

A given computer network may have a "noise" that is associated with abnormal, or anomalous, behavior. As an example, the noise may be associated with communications that attempt to access the network's dark IP address space. For example, a misconfigured network device may have an old, or stale, IP address for a server of the network. In this manner, the misconfigured network device may have configuration data representing an outdated static IP address rather than a host name for the server. As a result, the misconfigured network device may attempt but fail to communicate with the server using the stale, static IP address. The misconfiguration may be resolved by configuring the network device with the server's host name so that the network device uses the domain name service (DNS) in the future to obtain a valid IP address.

As another example, noise may be associated with communications that occur due to a network security intrusion. For example, a particular network device may be infected with malicious machine executable instructions (or "software"), such as malware, a virus, a worm, a Trojan horse, and so forth. Execution of these machine executable instructions, in turn, may cause the infected network device to form an adversary to search for devices and systems within the network, which may contain sensitive information (sensitive or confidential information of an organization, sensitive or confidential information of employees of the organization, and so forth). In this manner, the adversary may establish a foothold on an employee's computer and then perform network scanning for purposes of attempting to identify where to move laterally within the network. Techniques and systems are described herein for purposes of spotting such scanning activity, which precedes lateral movement, so that the lateral movement may be prevented from occurring.

One way to detect, or identify, anomalous network activity, or behavior, is to detect attempted accesses to the network's dark IP address space and then analyze network usage related to these accesses. Distinguishing between normal activity and anomalous activity, however, may be particularly challenging, especially when the activity is due to a network intrusion; and the adversary employs a stealthy mode of operation. For example, although one way for an adversary to scan the network IP address space is to scan a contiguous range, or block, of addresses, the adversary may work in conjunction with one or multiple other adversaries, which have established similar footholds in the network. In this manner, as a group, the adversaries may scan at different times or scan in ways to prevent the network scanning activity from easily being recognized as a pattern that is consistent with a network intrusion.

In accordance with example systems and techniques that are described herein, a server (a dynamic host configuration protocol (DHCP) server, for example) dynamically assigns network addresses within a network based on a schedule. In accordance with some implementations, the schedule may be generated by an entity other than the server, and data may be communicated to the server representing the schedule. In accordance with further example implementations, the server may generate the schedule. The schedule, in general, represents a time during which one or more parts of the otherwise assignable and routable IP address space within the network is to remain dark, or unassigned. Moreover, the server adheres to the schedule so that with knowledge of the dark IP address space, network usage attributable to anomalous behavior may be readily identified in real time or near real time. Accordingly, an adversary may be quickly identified before the adversary leaves the network; the extent of a security intrusion may be limited; a misconfigured network device may be quickly identified; and so forth.

In accordance with example implementations, the schedule may be varied over time, which may, for example, inhibit an adversary from mapping or learning the scheduled dark IP address space. As examples, the schedule may be varied daily, weekly, hourly, randomly, pseudo randomly, and so forth, depending on the particular implementation. As examples, a schedule that is provided to the server may be a time varying schedule that sets forth the dark IP address space for the network at different times; multiple schedules may be provided regularly to the server, and each schedule may set forth the IP addresses that are to remain dark until the next schedule is provided; and so forth. Regardless of the particular form of the schedule and how the schedule is provided to the server, knowledge of the schedule, along with observed network usage may be used to identify anomalous network behavior.

For example, data from router logs associated with network communications to the dark IP address space may be examined to extract features associated with these communications. The features may be, for example, the number of communications, patterns of the communications, and so forth. In accordance with example implementations, these features may be provided to one or multiple machine learning-based classification engines that classify the activity based on these features. As examples, the features may result in a classification of benign activity, a classification of a certain type or category of malicious behavior (a behavior associated with a recognized virus, for example), a classification of a category of network misconfiguration, and so forth. Depending on the particular implementation, machine learning-based classification may be supervised or unsupervised classification. Moreover, in accordance with further example implementations, anomalous network behavior may be recognized using approaches other than machine learning-based approaches.

As a more specific example, FIG. 1 depicts a network system 100 in accordance with example implementations. In general, the network system 100 includes network fabric 110 that may include various network fabric devices, such as interconnects, buses, switches, routers, and so forth, depending on the particular implementation. The network fabric 110, in general, includes one or multiple logs 112 (logs stored on routers or switches, for example), which contain logged, or historic data, pertaining to network usage and representing network communications. In general, the logs 112 may include data that may represent information such as source IP addresses associated with network communications; target IP addresses associated with network communications; and whether network communications failed due to attempted accesses to unassigned target IP addresses.

In accordance with some implementations, a given network device 120 may be a processor-based device, such as a laptop computer, a desktop computer, a thin client, a smartphone, a tablet computer, a wearable device, a client, a server, and so forth. In general, the network system 100 may be associated with a particular entity (a business organization, for example), and the network device 120 may be a device to which the organization has granted security credentials to allow the device 120 to access at least part of the network system 100.

Although a given network device 120 may have credentials to access at least some part of the computer network 100, the device 120 may attempt to access target IP addresses that are part of the dark IP address for the network 100. This may be due to, for example, the given network device 120 being misconfigured; the network device 120 being infected with malicious software (a virus, a worm, a Trojan horse, malware, and so forth); or other reason. As described herein, in accordance with example implementations, the computer network 100 has features to flag such accesses in a time efficient manner, to permit real time or near real time detection of misconfigurations and network security intrusions.

In accordance with example implementations, the computer network 100 includes one or multiple servers 130, which dynamically assign IP addresses, upon demand, from the routable IP address space within the network 100. As depicted in FIG. 1, in accordance with example implementations, the servers 130 may be dynamic host configuration protocol (DHCP) servers. In general, the DHCP protocol is a client-server protocol to provide an IP address and related configuration information (a subnet mask and a default gateway, for example) to a requesting host (a network device 120, for example).

In accordance with example implementations, a given server 130 may include one or multiple processors 132 (one or multiple central processing units (CPUs), one or multiple CPU processing cores, and so forth) and a non-transitory storage medium, such as a memory 134. In accordance with example implementations, the memory 134 may be formed from non-transitory storage devices, such as semiconductor storage devices, magnetic storage devices, memristors, phase change memory devices, non-volatile memory devices, volatile memory devices, memory devices associated with other storage technologies, a combination of one or multiple of the foregoing memory technologies, and so forth.

The memory 134 may, in accordance with example implementations, store data that represents a schedule 136. The schedule 136 defines a dark IP address space of the computer network 100, i.e., one or more parts of the network's otherwise routable IP address space as being unused, or not available, for assignment by the server 130 to the network devices 120. The schedule 136 also defines a time window for which the designated IP addresses are to remain dark.

In accordance with example implementations, when a network device 120 connects to the computer network 100, a server 130 may dynamically assign an IP address to the network device 120 from a pool of available IP addresses. In this manner, the "pool of available IP addresses" refers to the addresses within the routable IP address space that 1. is not identified as being part of the dark IP space by the schedule 136; and 2. is otherwise routable IP space that is available for assignment by the server 130 and is not currently leased to another network device.

For example, network device 120 may be a laptop computer, and the address space represented by the subnet a.b.c.0/24 may be reserved for portable computers. For this example, the schedule 136 may define part of this subnet as belonging to the dark IP address during non-business hours and may remove the restriction during normal business hours. In accordance with example implementations, the DHCP lease time is short enough to accommodate this change in the schedule 136. Therefore, when the network device 120 requests access to the network, the server 130 may select an address from the part of the a.b.c.0/24, which has not been already assigned and is not part of the dark IP address space represented by the schedule 136.

The schedule 136 may be dynamic, in that, in accordance with example implementations, the server 130 may be sent schedule updates (generated and sent by an analytics engine 150, for example, or other entity of the network 100); or in general, the server 130 may be programmed over time, so that the dark IP address space of the network 100 is also dynamic, and thus, changes over time. In this manner, depending on the particular implementation, the schedule 136 may change pursuant to a schedule (daily, weekly, hourly, and so forth), or the schedule 136 may be changed on a non-regular basis (at randomly or pseudo-randomly selected times, for example).

In accordance with example implementations, the analytics engine 150 analyzes network usage with knowledge of the schedule 136 for purposes of identifying anomalous behavior within the network 100. It is noted that the computer network 100 may provide this information to other network devices (e.g., a correlation engine, an intrusion detection system, or an intrusion prevention system) for purposes of analyzing the network usage with knowledge of the schedule 136. In accordance with some implementations, the analytics engine 150 may generate the schedule 136 and communicate with the server(s) 130 to change the versions of the schedules 136 that are stored by the servers 130; or in accordance with further example implementations, another entity of the computer network 100 may generate the schedule and communicate data representing the schedule to the analytics engine 150 and the server(s) 130.

In accordance with example implementations, the analytics engine 150 may be a processor-based machine, which includes one or multiple processors 154 (one or multiple CPUs, one or multiple CPU processing cores, and so forth) and a non-transitory storage medium, such as a memory 158. The memory 158 may be formed from non-transitory storage devices, such as the devices described above for the memory 134.

In general, as depicted in FIG. 1, the memory 158 may store machine executable instructions 162 (or "software"), which, when executed by one or multiple processors 154, cause the processor(s) 154 to perform one or more functions of the analytics engine 150, as described herein. Moreover, the memory 158 may store data 160, which may represent network usage; preliminary, intermediate or final processing results; an output representing a detected network intrusion; data representing a misconfigured network device; data representing the schedule 136; and so forth.

In accordance with further example implementations, the analytics engine 150 may be formed from hardware that does not execute machine executable instructions. In this regard, in accordance with further example implementations, one or multiple components of the analytic engine 150 may be formed from a field programmable gate array (FPGA), an application specific integrated circuit (ASIC), and so forth.

Moreover, in accordance with further example implementations, although the analytics engine 150 is schematically detected in FIG. 1 as being a single component, the analytics engine 150 may be distributed over multiple devices of the computer network 100; the analytics engine 150 may include one or multiple components that are not part of the computer network 100; and so forth. Thus, many implementations are contemplated, which are within the scope of the appended claims.

Figure 2:
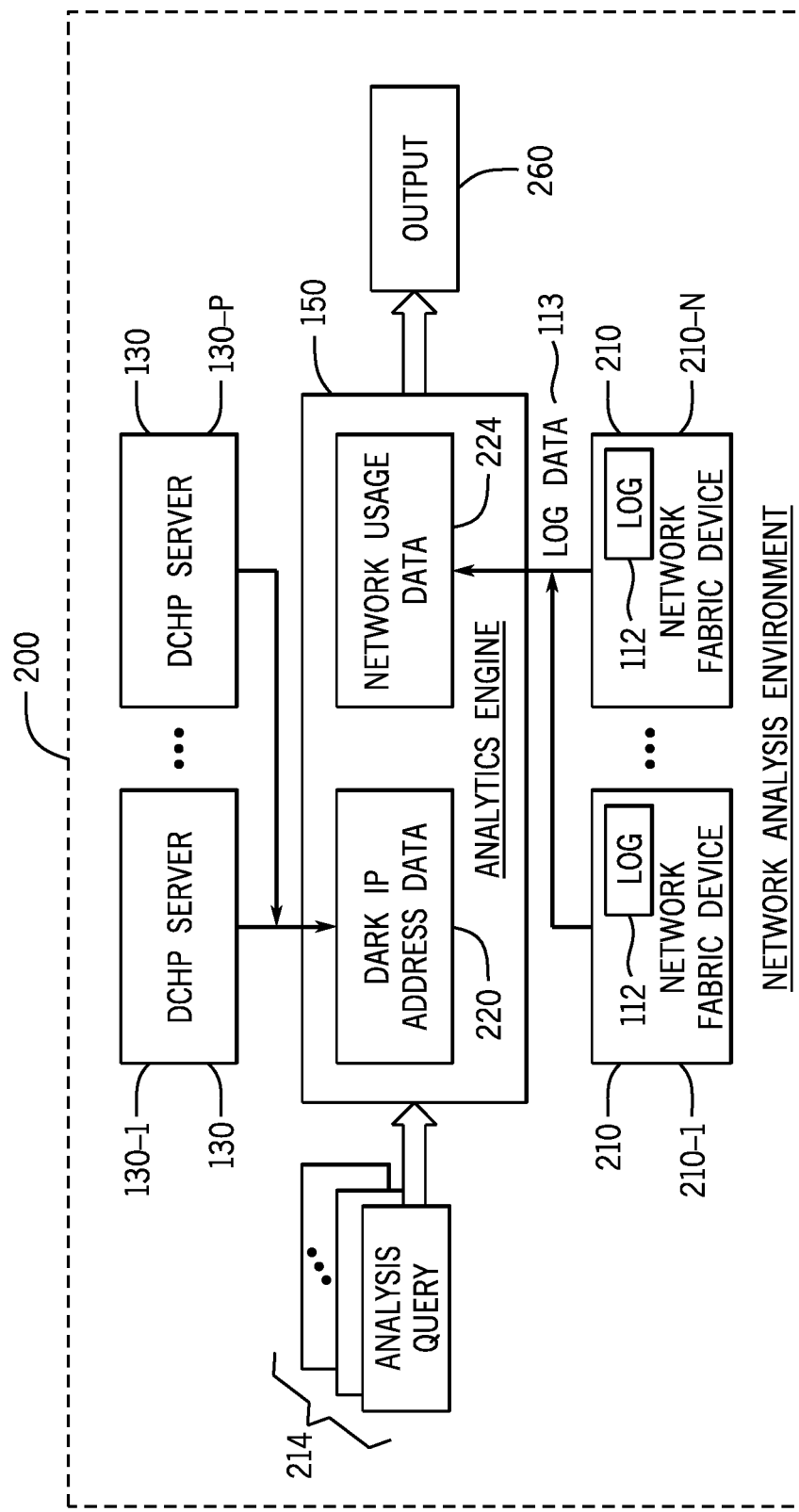
FIGS. 2, 3 and 4 are illustrations of network analysis environments according to example implementations.

Referring to FIG. 2 in conjunction with FIG. 1, in accordance with example implementations, a network analysis environment 200 may be used to detect and identify anomalous network activity, or behavior. In general, the analytics engine 150 may store dark IP address data 220 (in its memory 158, for example) representing the schedule 136 (FIG. 1); and network usage data 224 representing network usage information. In this manner, the dark IP address data 220 may represent current and/or, historical schedule information, which may be used by the analytics engine 150 with the network usage data 224 for the corresponding time windows. In accordance with example implementations, the network usage information data 224 may be derived from log data 113 communicated from N network fabric devices (network fabric devices 210-1 and 210-N, being depicted in FIG. 2). The network usage data 224 may represent, for example, features associated with attempted accesses to the dark IP address space of the computer network 100, such as, for example, the corresponding source IP accesses, the target dark IP addresses, the number of dark IP addresses for each of the source IP addresses, times associated with the attempted accesses, and so forth.

Depending on the particular implementation, the network usage data 224 may represent all network activity; and/or the network usage data 224 may represent network activity pertaining to attempted accesses to the dark IP address space. As depicted in FIG. 2, one or multiple analysis queries 214 may be submitted to the analytics engine 150 for purposes of searching for activity within the network 110 that is anomalous, or abnormal. For example, a query 214 may search for IP source addresses that are associated with attempted accesses to the dark IP address space. In accordance with some implementations, in response to such a query 214, the analytic engine 150 may return an output 260 that represents a list of source IP addresses (and/or a list of the corresponding network devices 120) that have recently requested access to IP addresses that are part of the dark IP address space for a specific time window. Moreover, the output 260 may, in accordance with example implementations, indicate an ordering, or priority, of the listed processor-based devices 120. In this manner, in accordance with some implementations, the output 260 may identify in descending order the network devices 120 associated with attempted dark IP address space accesses, with the highest ranked network devices 120 on the list being associated with the highest, or largest, number of attempted accesses to the dark IP address space.

In accordance with some implementations, the output 260 may be presented in the form of a graphical user interface (GUI), and the GUI may be used to submit the queries 214.

As a more specific example, in accordance with some implementations, the following query may be used to identify which IP addresses are trying to communicate with the dark IP address space:

select srcIP as Suspect,
 count(*) as Flows,
 count(distinct dstIP) as Dests
 from netflow
 where isDarkAddress (dstIP, start_time, end_time)
 group by Suspect
 order by Dests desc;

This query returns a list of "suspects," ordered by the number of dark IP addresses that the suspects have attempted to contact during the defined time window (the time window defined by start_time and end_time).

Figure 3:
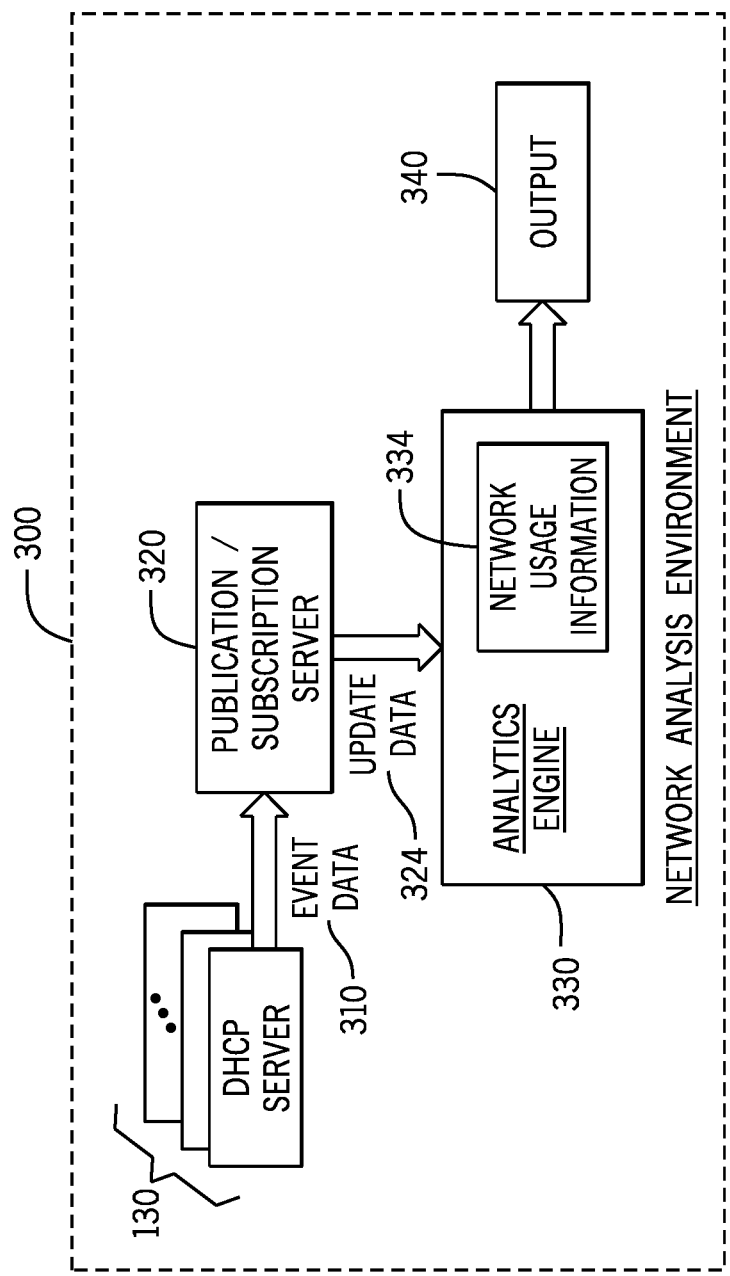

Referring to FIG. 3, in accordance with further example implementations, an analytics engine 330 (replacing the analytics engine 150) may be used in a network analysis environment 300. The analytics engine 330 stores network usage information data 334, which, for this example implementation, is derived from update data 324 acquired from a publication/subscription server 320. In this regard, in accordance with example implementations, the analytics engine 330 may subscribe to a publication service provided by the server 320 by identifying one or multiple topics and receiving the corresponding update data 324 in response thereto. More specifically, in accordance with example implementations, the topics may include network usage information for source IP addresses that attempt to communicate with certain target IP addresses. Here, the target IP addresses may be dark IP addresses, as denoted by the schedule 136 used by the DHCP servers 130. In this regard, the analytics engine 330 may change the inquiry representing the topics to be provided by the server 320 as the schedule changes. Therefore, in response to event data 310 that may be provided by the DHCP servers 130, the publication subscription server 320 forwards the requested topics in the form of the update data 324 to the analytics engine 330.

The network analysis environment 300 allows decisions and alerts to be made in real time or near real time, which provide an enhanced ability to track rogue devices before the devices leave the network 100.

Figure 4:
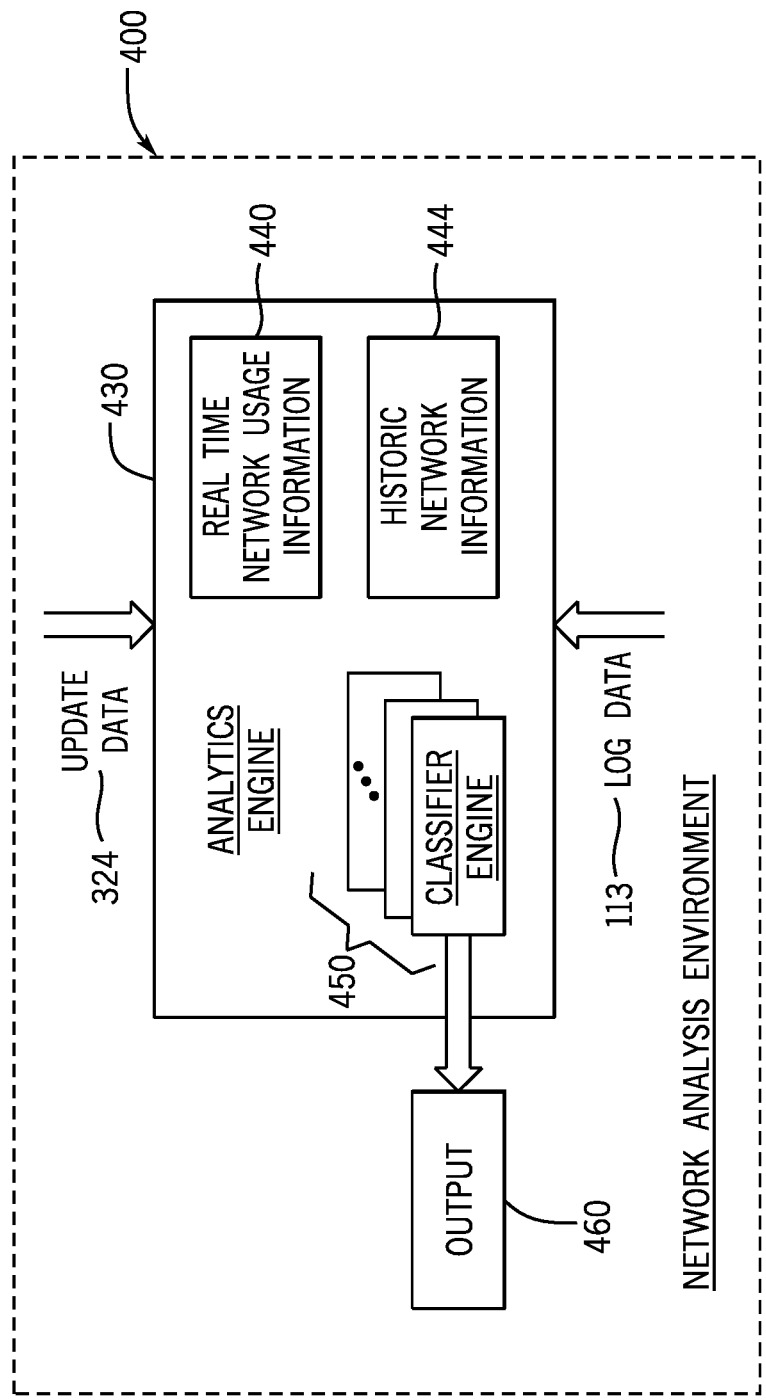

Referring to FIG. 4, in accordance with further example implementations, an analytics engine 430 (replacing the analytics engines 150 and 330) may use update data 324 provided by a publication/subscription service, as described above and providing real time network usage information data 440 and log data 113 (i.e., log data from the network devices, indicating historical network information data 444). Based on the real time network usage information data 440 and the historic network information data 444, one or multiple classifier engines 450 of the analytics engine 430 may classify detected anomalous behavior by a given network device as being associated with a network intrusion, being associated with a particular type of network intrusion, being associated with a misconfigured network device, and so forth. In general, the classifier engine(s) 450 may be trained using observed real time and historic data that was later determined to be associated with a network intrusion, a misconfigured network device, and so forth.

Thus, in accordance with example implementations, the techniques that are described herein may be used to identify possible misconfigurations or possible compromised systems that are trying to scan a network. The technique and systems that are described herein may compliment other techniques for identifying potential problems as well as aid in cleaning up misconfigured systems so there is less "noise" on the network. Other and different advantages may be achieved with further implementations.

As noted above, in accordance with some implementations, a component of the network 100 other than the DHCP server may generate the schedule 136 and communicate data to the DHCP server representing the schedule and/or representing updates to the schedule. In accordance with further example implementations, the DHCP server may generate the schedule and/or updates to the schedule. For example, in accordance with some implementations, a DHCP server may prepare a schedule for the IP addresses that the DHCP server manages, based on attributes in a configuration of the DHCP server. For example, the DHCP server may generate a schedule based on configuration settings specifying how many IP addresses that the DHCP server is to reserve, how long the DHCP server should reserve these addresses, how to select the reserved addresses, and so forth. In this manner, the DHCP server may periodically publish its schedule, or at least provide a representation of the dark IP addresses, so that analytics and/or security components of the network 100 may subscribe to the information.

In accordance with example implementations, for every time window of duration D, the DHCP server may ensure that N IP addresses are dark, according to a particular algorithm, which makes it difficult for adversaries to predict which IP addresses are or will be dark.

In accordance with further example implementations, the analytics engine may request N addresses to be dark for a particular time window T, and the DHCP server may respond with a subset of n IP addresses within these N IP addresses (n<N), which are dark for the time window T, based on demand for the IP addresses from clients.

Figure 5:
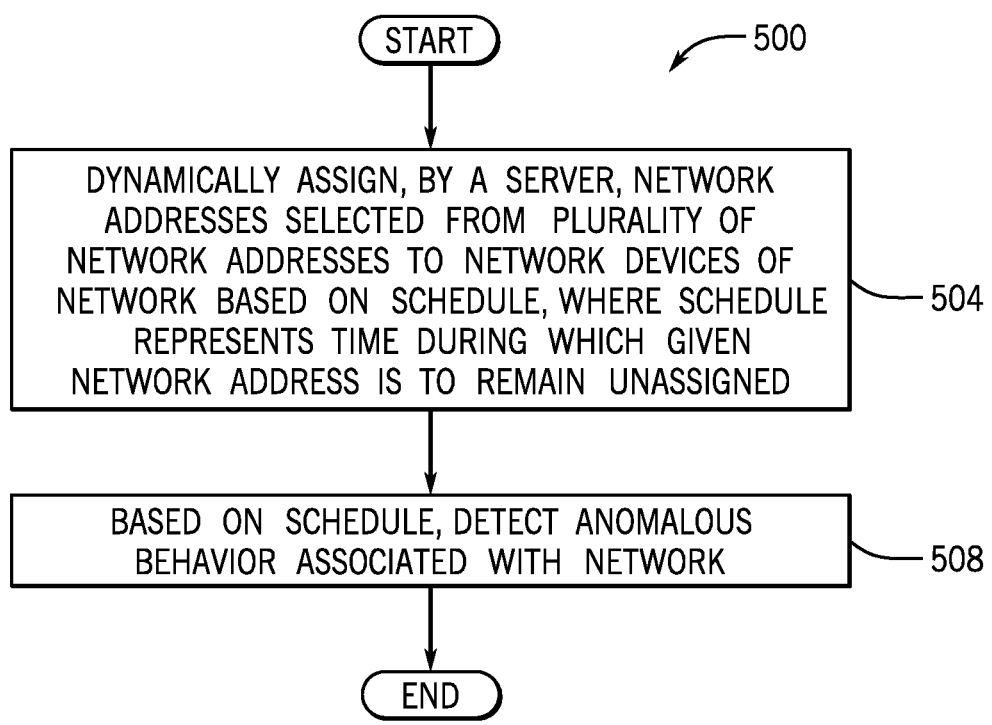
FIG. 5 is a flow diagram depicting a technique to detect anomalous behavior associated with a network according to example implementations.

Referring to FIG. 5, thus, in accordance with example implementations, a technique 500 includes dynamically assigning (block 504), by a server, network addresses, which are selected from a plurality of network addresses to network devices of a network based on a schedule. The schedule represents a time during which a given network address is to remain unassigned. The technique 500 includes, based on the schedule, detecting (block 508) anomalous behavior associated with the network.

Figure 6:
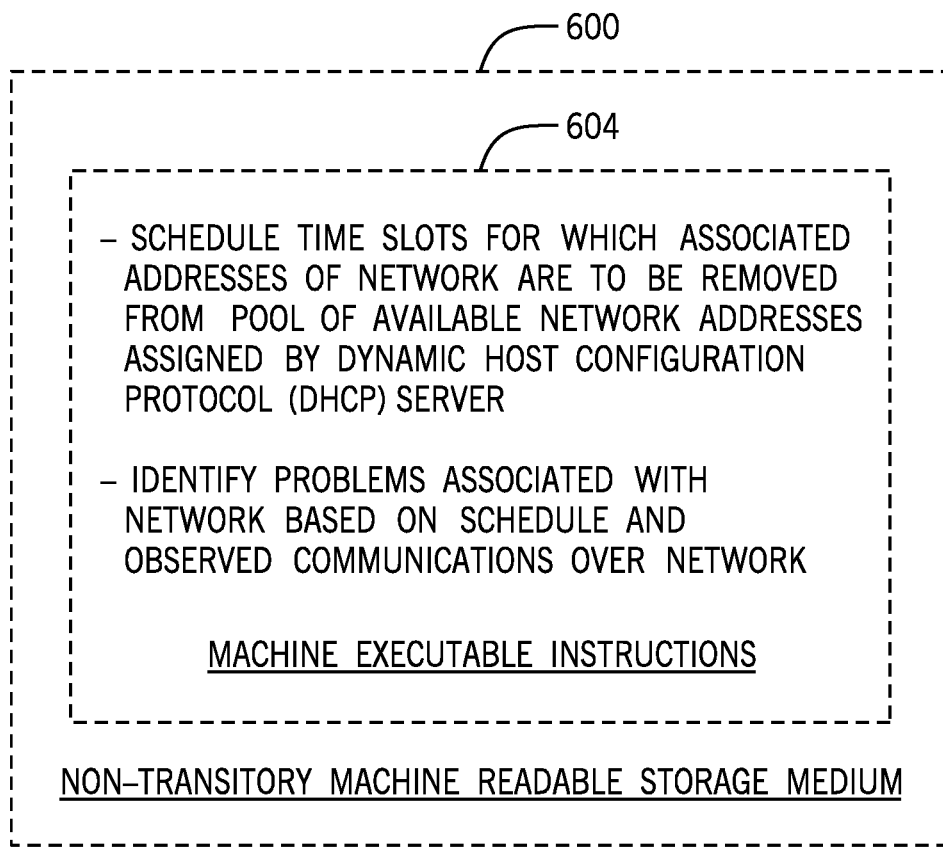
FIG. 6 is an illustration of a non-transitory machine readable storage medium storing machine executable instructions to detect anomalous behavior associated with a network according to example implementations.

Referring to FIG. 6, a non-transitory machine readable storage medium 600 may store machine executable instructions 604 that, when executed by the machine, may cause the machine to schedule time slots for which associated addresses of a network are removed from a pool of available network addresses assigned by a dynamic host configuration protocol (DHCP) server. The instructions 604, when executed by the machine, may cause the machine to identify the problems that are associated with the network based on the schedule and observed communications over the network.

Figure 7:
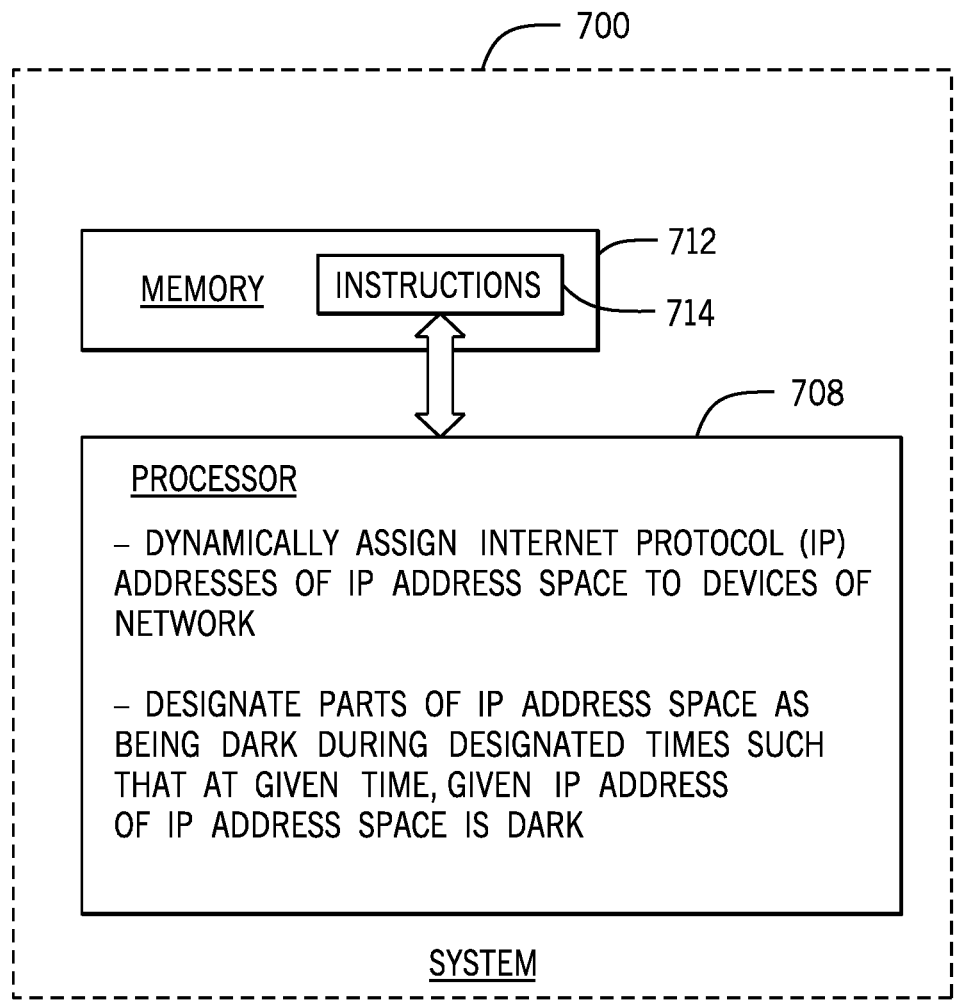
FIG. 7 is a schematic diagram of a system that detects anomalous behavior associated with a network according to an example implementation.

Referring to FIG. 7, a system 700 includes a memory 712 and a processor 708. The memory 712 stores instructions 714 that, when executed by the processor 708, cause the processor 708 to dynamically assign Internet Protocol (IP) addresses of an IP address space to devices of a network; and designate parts of the IP address space as being dark during designated times such that at a given time, a given IP address of the IP address space is dark.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
    dynamically assigning, by a server, network addresses selected from a plurality of network addresses to network devices of a network based on a schedule, wherein the schedule represents a given network address of the plurality of network addresses and a time during which the given network address is to remain unassigned and in a dark address space; and
    based on the schedule, detecting an anomalous behavior associated with the network.

2. The method of claim 1, wherein detecting the anomalous behavior comprises:
    detecting an attempted communication with the given network address during the time which the given network address is to remain unassigned and in the dark address space.

3. The method of claim 2, wherein detecting the attempted communication comprises identifying a source network address associated with the attempted communication, and wherein the method further comprises performing network intrusion analysis based on the source network address.

4. The method of claim 3, wherein performing network intrusion analysis comprises identifying a network threat based on the source network address and a pattern of network activity.

5. The method of claim 1, further comprising:
    by the server, generating the schedule.

6. The method of claim 1, wherein detecting the anomalous behavior comprises:
    detecting a behavior associated with a security intrusion or a network misconfiguration.

7. The method of claim 1, further comprising:
    generating the schedule; and
    communicating data to the server representing the schedule.

8. An article comprising a non-transitory machine readable storage medium to store instructions that, when executed by a machine, cause the machine to:
- schedule time slots for which associated addresses of a network are to be removed from a pool of available network addresses assigned by a dynamic host configuration protocol (DHCP) server and be within an unassigned dark address space; and
- identify problems associated with the network based on the scheduling of the time slots and observed communications over the network.

9. The article of claim 8, wherein the instructions, when executed by the machine, cause the machine to vary the scheduling of the time slots with respect to time.

10. The article of claim 8, wherein the instructions, when executed by the machine, cause the machine to flag communications over the network associated with attempted communications with network addresses that are removed from the pool and are within the dark address space due to the scheduling of the time slots.

11. The article of claim 8, wherein the instructions, when executed by the machine, cause the machine to:
- determine a list of source addresses associated with attempted communications with network addresses that are removed from the pool and are within the dark address space due to the scheduling of the time slots; and
- order the source addresses in the list such that a source address of the source addresses associated with a relatively larger number of attempted accesses has a higher priority than a source address of the source addresses associated with a relatively smaller number of attempted accesses.

12. The article of claim 8, wherein the instructions, when executed by the machine, cause the machine to apply machine learning based on communications over the network associated with attempted communications with network addresses that are removed from the pool and are within the dark address space due to the scheduling of the time slots to identify a network security threat.

13. The article of claim 8, wherein the instructions, when executed by the machine, cause the machine to identify a source IP address associated with an attempted communication to a network address of the network addresses that are removed from the pool and are within the dark address space due to the scheduling of the time slots.

14. The article of claim 8, wherein the instructions, when executed by the machine, cause the machine to communicate data representing the scheduling of the time slots to the DHCP server.

15. The article of claim 8, wherein the instructions, when executed by the machine, cause the machine to use the scheduling of the time slots and a log representing the observed communications over the network to classify the problems.

16. The article of claim 8, wherein the instructions, when executed by the machine, cause the machine to identify a misconfigured network device based on the schedule and the observed communications over the network.

17. A system comprising:
- a processor; and
- a memory to store instructions that, when executed by the processor, cause the processor to:
  - dynamically assign Internet Protocol (IP) addresses of an IP address space to devices of a network; and
  - designate parts of the IP address space as being dark during designated times such that at a given designated time of the designated times, a given IP address of the IP address space is dark and is unavailable for dynamic assignment to any of the devices, and at a second time other than the given designated time, the given IP address is available for the dynamic assignment to the devices.

18. The system of claim 17, wherein the memory stores instructions that, when executed, cause the processor to use a dynamic host configuration protocol (DHCP) server to dynamically assign the IP addresses.

19. The system of claim 17, wherein the instructions, when executed by the processor, cause the processor to publish a schedule representing the parts of the IP address space.

20. The system of claim 17, wherein the instructions, when executed by the processor, cause the processor to vary over time the parts of the IP address space.

* * * * *